United States Patent [19]

Liou

[11] 4,351,621
[45] Sep. 28, 1982

[54] CONNECTOR FOR COMBINATION FURNITURE

[76] Inventor: Jin S. Liou, No. 315-319, Sec. 5, Yen-Pin N. Rd., Taipei, Taiwan

[21] Appl. No.: 105,301

[22] Filed: Dec. 19, 1979

[51] Int. Cl.³ .......................... F16D 1/00; F16D 3/00
[52] U.S. Cl. .................................... 403/217; 403/406; 403/362; 248/188.7; 248/165; 248/529
[58] Field of Search ............... 403/171, 217, 218, 219, 403/231, 406, 405, 170, 174, 178, 187, 188, 191, 361; 248/188, 188.7, 165, 529

[56] References Cited

U.S. PATENT DOCUMENTS

| | | | |
|---|---|---|---|
| 1,330,427 | 2/1920 | Bolens | 248/188.7 |
| 3,342,457 | 9/1967 | Boborowski | 403/362 X |
| 3,715,136 | 2/1973 | Yoshida | 403/294 X |
| 4,159,096 | 6/1979 | Chase | 248/188.7 |

Primary Examiner—Wayne L. Shedd
Attorney, Agent, or Firm—Cushman, Darby & Cushman

[57] ABSTRACT

A connector for connecting sheet members together to form furniture with a connector body having outwardly extending and facing slots extending about a central axis. Each slot receives a sheet member which is locked in place with a set screw. A plastic liner is preferably provided between the slot walls and member.

1 Claim, 5 Drawing Figures

CONNECTOR FOR COMBINATION FURNITURE

BACKGROUND OF THE INVENTION

Conventional furniture such as diningroom tables, coffee tables, etc. of conventional wood or metal material usually cannot be readily disassembled. Thus, it is very inconvenient to carry such furniture and the style is limited by the nature of the material. For these reasons, combination furniture which can be readily disassembled has become very popular. Such furniture possesses the possibility of unusual designs, beautiful appearance and practicality in transportation.

SUMMARY OF THE INVENTION

The invention relates to a connector for combination furniture which is particularly practical. According to the present invention, a connector is provided having a connector body with a plurality of slots extending outwardly from a central axis. Each slot is U-shaped with the open end facing outward for receiving a sheet member. The sheet members can be locked into the slot, for example, by a set screw and a plastic or other U-shaped liner is preferably provided between each respective sheet member and the associated slot.

Figure 1:
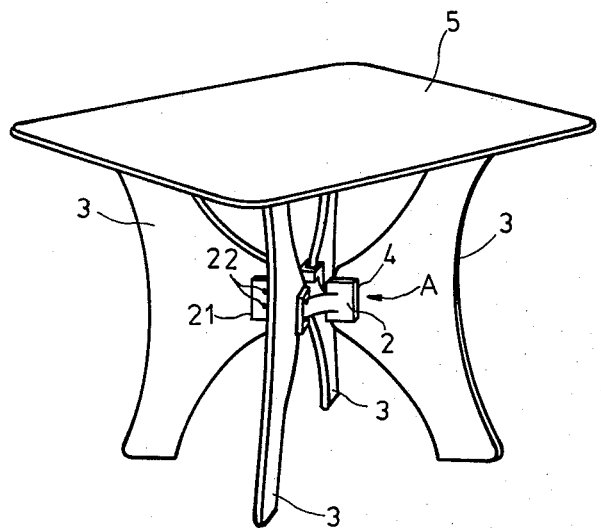
FIG. 1 is a perspective view of a table utilizing the connector of the present invention.
Figure 2:
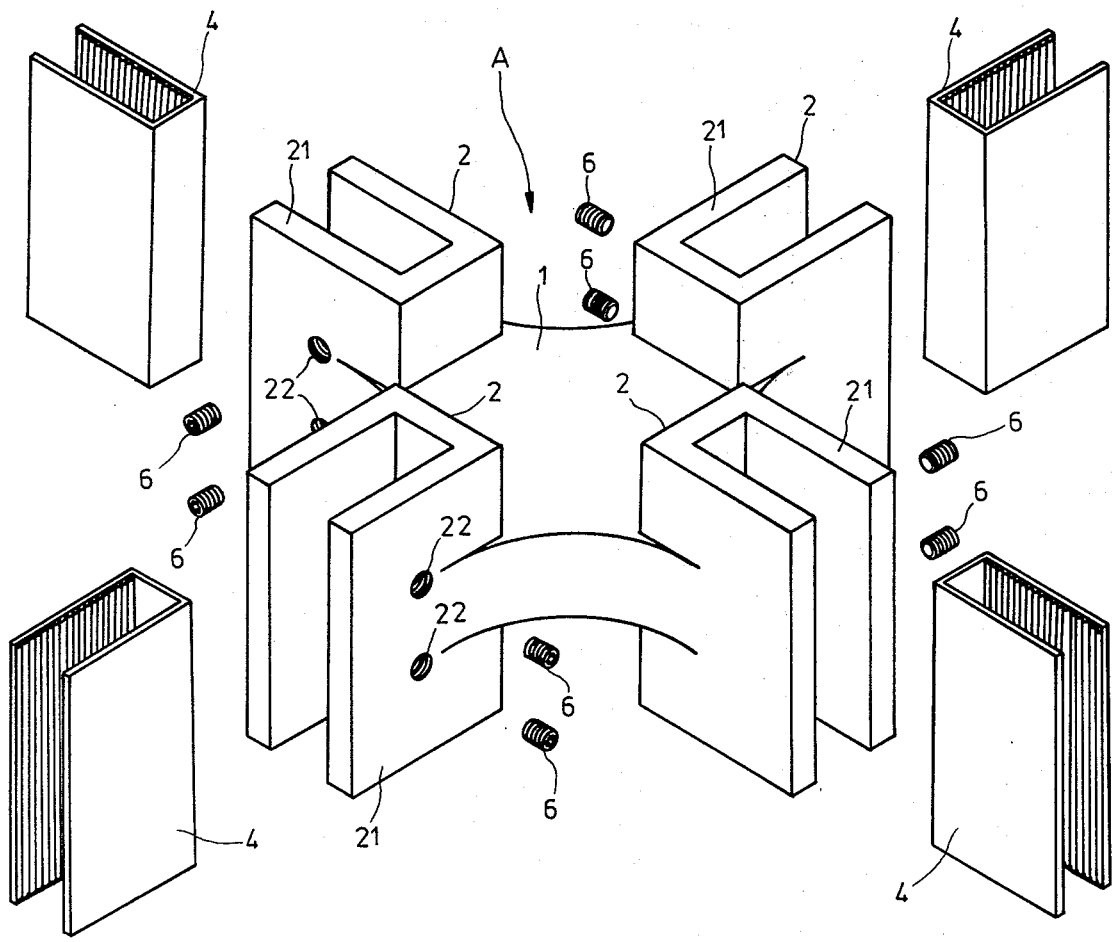
FIG. 2 is an exploded view of the connector of the present invention.

DETAILED DESCRIPTION OF THE DRAWINGS:

Reference is now made to the drawings which show the present invention. As can be seen in FIGS. 1 and 2, connector body 1 includes a plurality of slots 2 which each receives a plate or sheet 3 to form a table or other similar piece of furniture. These plates or sheets are of considerable thickness and may be made of glass, plastic, marble, and formed into any desirable shape. A table plate 5 is placed on top of the connector. A soft liner can be set between the sheets 3 and the table plate.

As can be best seen in FIG. 2 a liner 4 made of flexible material such as plastic is preset in each inserting slot of the connector body 2. When the sheet 3 is inserted, liner 4 tightly clamps the plate or sheet so that the walls of the slot 2 and the sheet 3 are not in direct contact with each other. A set screw 6 locks the sheet in each slot.

Figure 3:
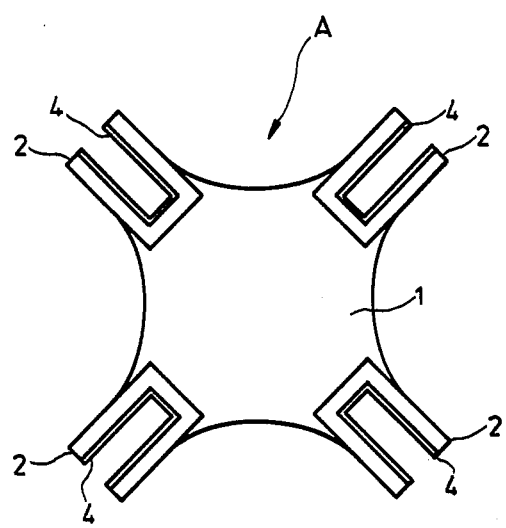
FIGS. 3, 4, and 5 are schematic views, showing different arrangements of connectors.
Figure 4:
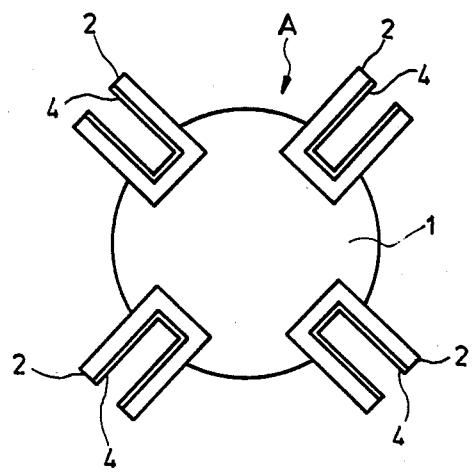
Figure 5:
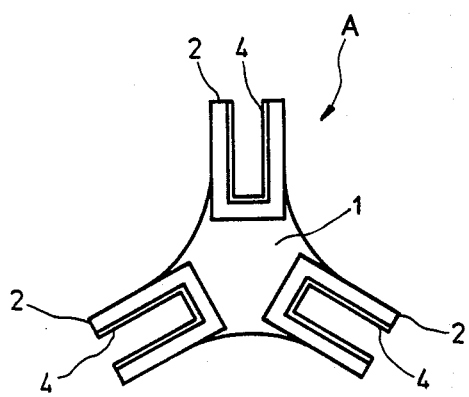

As shown in FIGS. 3, 4, and 5, the connector body 1 may take different shapes such as square, round, triangular, etc., and the number of slots may be varied to meet any particular design requirements.

I claim:

1. A connector for connecting together sheet members having separated, flat parallel extending surfaces to form pieces of furniture comprising:
    a connector body having a central axis and defining four U-shaped open ended slots extending outward from said axis with the open end of each said slot facing outward for receiving a sheet member;
    a U-shaped plastic liner in each said slot between the interior walls of that slot and said sheet; and
    a set screw in a threaded hole through a wall of each slot for contacting said liner for locking a received member in place in a slot.

* * * * *